US009168552B2

(12) United States Patent
Symonds

(10) Patent No.: US 9,168,552 B2

(45) Date of Patent: Oct. 27, 2015

(54) SPRAY SYSTEM FOR APPLICATION OF ADHESIVE TO A STATOR TUBE

(75) Inventor: Daniel H. Symonds, Jersey Village, TX (US)

(73) Assignee: Smith International, Inc., Houston, TX (US)

( * ) Notice: Subject to any disclaimer, the term of this patent is extended or adjusted under 35 U.S.C. 154(b) by 244 days.

(21) Appl. No.: 13/594,271

(22) Filed: Aug. 24, 2012

(65) Prior Publication Data

US 2013/0055544 A1 Mar. 7, 2013

Related U.S. Application Data

(60) Provisional application No. 61/527,152, filed on Aug. 25, 2011.

(51) Int. Cl.

*B05D 7/22* (2006.01)

*B05B 13/06* (2006.01)

(Continued)

(52) U.S. Cl.

CPC ......... *B05B 13/0636* (2013.01); *B05B 13/0654* (2013.01); *B05D 1/002* (2013.01); *B05D 1/02* (2013.01); *B05D 7/222* (2013.01); *B05B 7/0408* (2013.01); *Y10T 29/49867* (2015.01); *Y10T 29/49885* (2015.01); *Y10T 29/49888* (2015.01); *Y10T 29/49982* (2015.01)

(58) Field of Classification Search

CPC .......... B05D 7/222; B05D 1/002; B05D 1/02; B05B 13/0636; B05B 13/0654; B05B 7/0408; Y10T 29/49982; Y10T 29/49867; Y10T 29/49888; Y10T 29/49885

USPC ......... 29/458, 460, 527.2; 118/318, 317, 320, 118/300, 306, 305; 427/231

See application file for complete search history.

(56) References Cited

U.S. PATENT DOCUMENTS 3,606,862 A * 9/1971 Huff et al. .................... 118/306

3,797,456 A 3/1974 Hogstrom (Continued)

FOREIGN PATENT DOCUMENTS

CA 2451390 A1 2/2003

EP 1693571 B1 3/2010

(Continued)

OTHER PUBLICATIONS

Fleischmann, Wolfgang , "Process safety by controlled adhesive application", International Journal of Materials and Product Technology, vol. 14(5-6), Nov. 1999, pp. 399-410.

(Continued)

*Primary Examiner* — John C Hong

(74) *Attorney, Agent, or Firm* — Mark D. Shelley, II

(57) ABSTRACT

Spray assemblies for use in coating a regular or irregular internal surface of a cylinder, and methods for coating the inside of a cylinder are disclosed. The spray assemblies may include: a spray head comprising a nozzle for spraying a coating material on an internal surface of a cylinder; a support wand coupled to the spray head; and a roller sleeve rotatably connected to the support wand and configured to contact the internal surface of the cylinder and to rotate radially as the cylinder is rotated. The spray assemblies may be used to provide a consistent and repeatable coating thickness, regardless of cylinder internal diameter. In some embodiments, the spray assemblies may be used to coat the internal surface of a stator tube.

47 Claims, 4 Drawing Sheets

(51) Int. Cl.

| | |
|---|---|
| ***B23P 13/00*** | (2006.01) |
| ***B05D 1/00*** | (2006.01) |
| ***B05D 1/02*** | (2006.01) |
| *B05B 7/04* | (2006.01) |

(56) References Cited

U.S. PATENT DOCUMENTS

| | | | |
|---|---|---|---|
| 4,866,241 | A | 9/1989 | Doherty et al. |
| 5,587,018 | A | 12/1996 | Chung |
| 6,066,575 | A | 5/2000 | Reardon et al. |
| 6,568,076 | B2 | 5/2003 | Bottos et al. |
| 6,604,921 | B1 | 8/2003 | Plop et al. |
| 6,604,922 | B1 | 8/2003 | Hache |
| 6,632,475 | B1 | 10/2003 | Bleggi |
| 6,660,087 | B2 | 12/2003 | Murakami et al. |
| 6,691,932 | B1 | 2/2004 | Schultz et al. |
| 6,790,281 | B2 | 9/2004 | Doi et al. |
| 7,204,326 | B2 | 4/2007 | Downie et al. |
| 7,396,220 | B2 | 7/2008 | Delpassand et al. |
| 7,517,202 | B2 | 4/2009 | Delpassand |
| 7,739,792 | B2 | 6/2010 | Lee et al. |
| 7,757,781 | B2 | 7/2010 | Hay et al. |
| 7,878,774 | B2 | 2/2011 | Speckert |
| 7,950,914 | B2 | 5/2011 | Hooper et al. |
| 2004/0200642 | A1 | 10/2004 | Downie et al. |
| 2006/0153724 | A1 | 7/2006 | Delpassand |
| 2006/0182643 | A1 | 8/2006 | Delpassand et al. |
| 2006/0182644 | A1 | 8/2006 | Delpassand et al. |
| 2008/0304991 | A1 | 12/2008 | Speckert |
| 2009/0169404 | A1 | 7/2009 | Sindt et al. |
| 2010/0284843 | A1 | 11/2010 | Jäger |
| 2011/0103989 | A1 | 5/2011 | Johnson |
| 2011/0116959 | A1 | 5/2011 | Akbari et al. |
| 2011/0116960 | A1 | 5/2011 | Akbari et al. |
| 2011/0116961 | A1 | 5/2011 | Akbari et al. |
| 2011/0150685 | A1 | 6/2011 | Wilbourn et al. |

FOREIGN PATENT DOCUMENTS

| | | | |
|---|---|---|---|
| GB | 2423318 | A | 8/2006 |
| GB | 2441189 | A | 2/2008 |
| GB | 2463594 | A | 3/2010 |
| WO | 0201036 | A1 | 1/2002 |
| WO | 2008153891 | A1 | 12/2008 |
| WO | 2009087475 | A2 | 7/2009 |
| WO | 2011058294 | A2 | 5/2011 |
| WO | 2011058295 | A2 | 5/2011 |

OTHER PUBLICATIONS

Mulder, et al., "Bituseal: a decade of development in hot applied pipeline coating", Corros. Manage., Issue 15, 1997, pp. 8-14.

Mulder, et al., "Development of modified bitumen enamel pipe coating systems", Protective Coatings Europe PCE, vol. 6(7), 2001, pp. 50-54.

Orchard, Bryan , "Performance factors for progressing cavity pumps", World Pumps, vol. 2005(467), Aug. 2005, pp. 36-38.

Sellers, et al., "Laboratory Apparatus for Applying Air-Sprayed Powdered Adhesive", Forest Products Journal, vol. 50(5), 2000, pp. 88-90.

Sitton, Charlotte , "Stator Design with Barrier for Use of Adhesives to Secure Stators", IP.com Prior Art Database Disclosure, Jul. 1, 1988, 2 pages.

Abstract of Von Seggern, et al., "Reactive coat: rotational coating of cylinder and pipes with high reactive polyurethane-systems", Kunststoffe, vol. 89(9), 1999, 6 pages.

Examiner's Report for Canadian Application No. 2,787,730 dated Jun. 4, 2014.

* cited by examiner

SPRAY SYSTEM FOR APPLICATION OF ADHESIVE TO A STATOR TUBE

CROSS-REFERENCE TO RELATED APPLICATION

This application, pursuant to 35 U.S.C. §119(e), claims priority to U.S. Provisional Application Ser. No. 61/527,152, filed Aug. 25, 2011. That application is herein incorporated by reference in its entirety.

FIELD OF THE DISCLOSURE

Embodiments disclosed herein relate generally to spray coating of internal surfaces of tubular objects. More specifically, embodiments disclosed herein relate to spray coating of adhesive to an internal surface of a stator tube, where the internal surface may be relatively flat or may include an irregular surface, such as a stator tube having a contoured surface, for example, helical ribs.

BACKGROUND

Coating of an interior surface of a cylinder, such as a pipe or tube, may be accomplished, for example, by pouring a coating composition and rotating the cylinder. However, the resulting coating may have a significant variance in the thickness of the resulting thin film of the coating composition.

Spray coating the interior of a cylinder may be accomplished by an air atomizing or airless spray nozzle mounted on a lance that is reciprocated into and out of the cylinder while the cylinder is rotated. Various issues associated with spray coating may include uneven film thickness, helical streaks or runs along the cylinder wall, such as may be due to a low viscosity for the coating material), and slumping, as may result when the coating solution is too thick. Overspray and the maintenance issues associated with overspray should also be considered with respect to costs and maintenance.

Spray coating may be performed, for instance, using a bore centralizer to control or maintain the position of the spray nozzle or the lance at the center of the cylinder. For example, a spray nozzle may be provided with multiple spring-loaded legs to maintain the nozzle in the center of the cylinder. The length of the legs may be such that the centralizer may be used for cylinders having different internal diameters.

Use of a bore centralizer may be potentially satisfactory for a single cylinder internal diameter. However, such may not be suitable for use with different diameters, as significant issues may be encountered with respect to volume of delivery, atomization/dispersion of the coating material, differences in overspray turbulence, and control of the overlap of the resulting spray per cylinder rotation, among other challenges that may result due to differences in the distance between the internal surface of the cylinder and the spray nozzle. Control issues may also be exacerbated by a cylinder having an irregular internal surface, including maintenance of the spray nozzle in the center of the bore.

SUMMARY OF THE CLAIMED EMBODIMENTS

In one aspect, embodiments disclosed herein relate to a spray assembly for use in coating a regular or irregular internal surface of a cylinder. The spray assembly may include: a spray head comprising a nozzle for spraying a coating material on an internal surface of a cylinder; a support wand coupled to the spray head; and a roller sleeve rotatably connected to the support wand and configured to contact the internal surface of the cylinder and to rotate radially as the cylinder is rotated.

In another aspect, embodiments disclosed herein relate to a method for spray coating an internal surface of a cylinder, the method including: inserting a spray assembly into a cylinder, the spray assembly comprising: a spray head comprising a nozzle for spraying a coating material on an internal surface of the cylinder; a support wand coupled to the spray head; and a roller sleeve rotatably connected to the support wand and configured to contact the internal surface of the cylinder and to rotate radially as the cylinder is rotated; withdrawing the spray assembly from the cylinder while rotating the cylinder; supplying the coating material to the spray head to coat the internal surface of the cylinder with the coating material.

In another aspect, embodiments disclosed herein relate to a method of manufacturing a stator, including: inserting a spray assembly into a stator tube, the spray assembly comprising: a spray head comprising a nozzle for spraying a coating material on an internal surface of the stator tube; a support wand coupled to the spray head; and a roller sleeve rotatably connected to the support wand and configured to contact the internal surface of the stator tube and to rotate radially as the stator tube is rotated; supplying the coating material to the spray head to coat the internal surface of the stator tube with the coating material; withdrawing the spray assembly from the stator tube while rotating the cylinder; and subsequently inserting or molding an elastomeric stator lining into the stator tube.

In another aspect, embodiments disclosed herein relate to a method for uniformly spray coating an internal surface of cylinders having different internal diameters, the method including: inserting a spray assembly into a first cylinder, the spray assembly comprising: a spray head comprising a nozzle for spraying a coating material on an internal surface of the cylinder; a support wand coupled to the spray head; and a roller sleeve rotatably connected to the support wand and configured to contact the internal surface of the cylinder and to rotate radially as the cylinder is rotated; supplying the coating material to the spray head to coat the internal surface of the first cylinder with the coating material; withdrawing the spray assembly from the first cylinder while rotating the cylinder; inserting the spray assembly into a second cylinder having a different internal diameter than the first cylinder; supplying the coating material to the spray head to coat the internal surface of the second cylinder with the coating material; withdrawing the spray assembly from the second cylinder while rotating the cylinder.

Other aspects and advantages will be apparent from the following description and the appended claims.

DETAILED DESCRIPTION

In one aspect, embodiments herein relate generally to spray coating of internal surfaces of tubular objects. More specifically, embodiments disclosed herein relate to spray coating of adhesive to an internal surface of a stator tube, where the internal surface may be relatively flat or may include an irregular surface, such as a stator tube having a contoured surface, for example, helical ribs.

Figure 1:
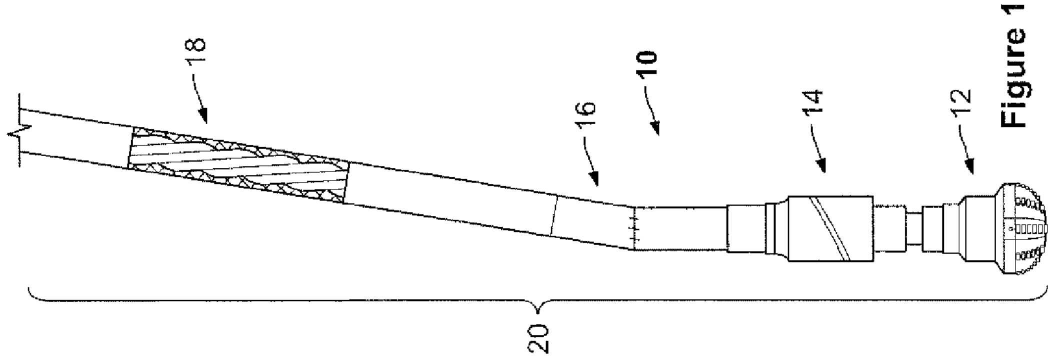
FIG. 1 is a schematic diagram of a drill string comprising a downhole motor comprising a stator that may be manufactured according to embodiments disclosed herein.

Modern downhole motors, also known as progressive cavity motors or simply as mud motors, are powered by circulating drilling fluid (mud), which also acts as a lubricant and coolant for the drill bit, through a drill string in which a downhole motor is conveyed. Referring now to FIG. 1, a downhole motor assembly is illustrated. The motor assembly 10 generally includes a rotatable drill bit 12, a bearing/stabilizer section 14, a transmission section 16 which may include an adjustable bent housing, and a motor power section 18. The bent housing 16 is not an essential part of the motor assembly, and is only used in directional drilling applications. During operation, drilling fluid pumped through the drill string 20 from the drilling rig at the earth's surface passes through the motor power section 18 and exits the assembly 10 through the drill bit 12.

Figure 3:
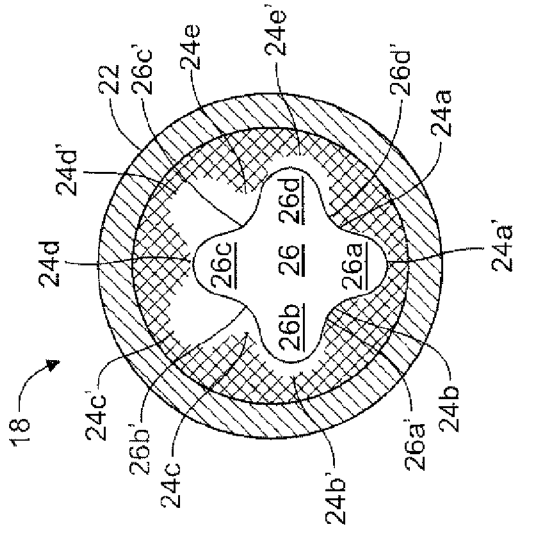
FIG. 3 is a cross-sectional view of the power section of the downhole motor, taken along section line 3-3 of FIG. 2.
Figure 2:
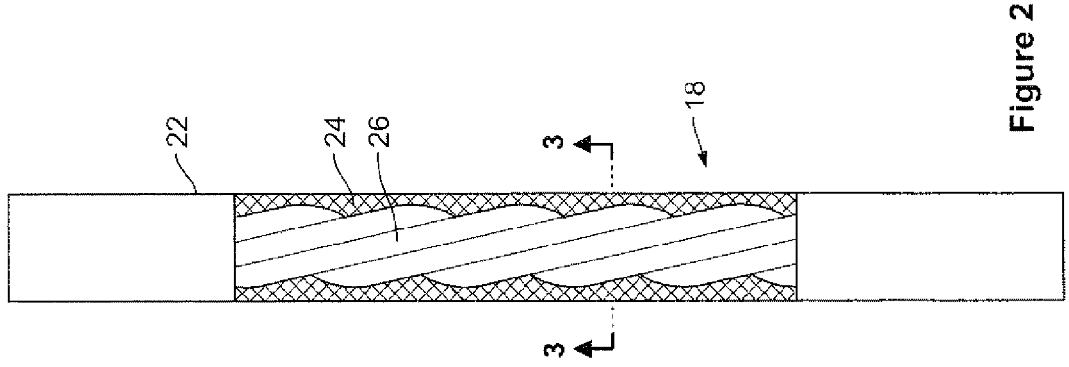
FIG. 2 shows a detailed view of the power section of the downhole motor of FIG. 1.

FIGS. 2 and 3 show details of the power section 18 of the downhole motor. The power section 18 generally includes a tubular housing 22 which houses a motor stator 24 within which a motor rotor 26 is rotationally mounted. The power section 18 converts hydraulic energy into rotational energy by reverse application of the Moineau pump principle. It will be appreciated by those skilled in the art that the difference between a "motor" and a "pump" as used herein is the direction of energy flow. Thus, a progressive cavity motor may be operated as a progressive cavity pump by direct (as opposed to reverse) application of the Moineau pump principle wherein rotational energy is converted into hydraulic energy. For the sake of clarity, the term "motor" will be used hereafter to mean a device that transforms energy between hydraulic energy and rotational energy, typically (but not exclusively) in the direction of a hydraulic-to-rotational energy transformation.

The stator 24 has a plurality of helical lobes, 24*a*-24*e*, which define a corresponding number of helical cavities, 24*a*'-24*e*'. The rotor 26 has a plurality of lobes, 26*a*-26*d*, which number one fewer than the number of stator lobes and which define a corresponding plurality of helical cavities 26*a*'-26*d*'. Generally, the greater the number of lobes on the rotor and stator, the greater the torque generated by the motor power section 18. Fewer lobes will generate less torque but will permit the rotor 26 to rotate at a higher speed. The torque output by the motor is also dependent on the number of "stages" of the motor, a "stage" being one complete spiral of the stator helix.

The rotor is typically made of a suitable steel alloy (e.g., a chrome-plated stainless steel) and is dimensioned to form a tight fit (i.e., very small gaps or positive interference) under expected operating conditions, as shown in FIG. 3. It is generally accepted that either or both the rotor and stator must be made compliant in order to form suitable hydraulic seals. The rotor 26 and stator 24 thereby form continuous seals along their matching contact points which define a number of progressive helical cavities. When drilling fluid (mud) is forced through these cavities, it causes the rotor 26 to rotate relative to the stator 24.

The stator 24 primarily consists of an elastomeric lining that provides the lobe structure of the stator. The stator lining may be, for example injection-molded into the bore of the housing 22.

The interior surface of the housing 22 may be coated with an adhesive prior to injection molding of the stator lining into the housing, where the adhesive may be used to aid in preventing relative movement between the stator and the housing, such as may occur under the forces exerted by the drilling mud or as may be experienced during assembly of the motor. The adhesive may include a one-part composition compatible with both the elastomeric stator and the housing material, which is commonly steel, but may also be formed from other materials of manufacture. The adhesive may also include two-part or multiple-part compositions that may include a primer, an adhesive, which may be a single component composition or a two- or multiple-component composition, and a topcoat, where one or more of the layers may be compatible with the housing, and one or more layers may be compatible or reactive with the elastomeric stator.

Figure 4:
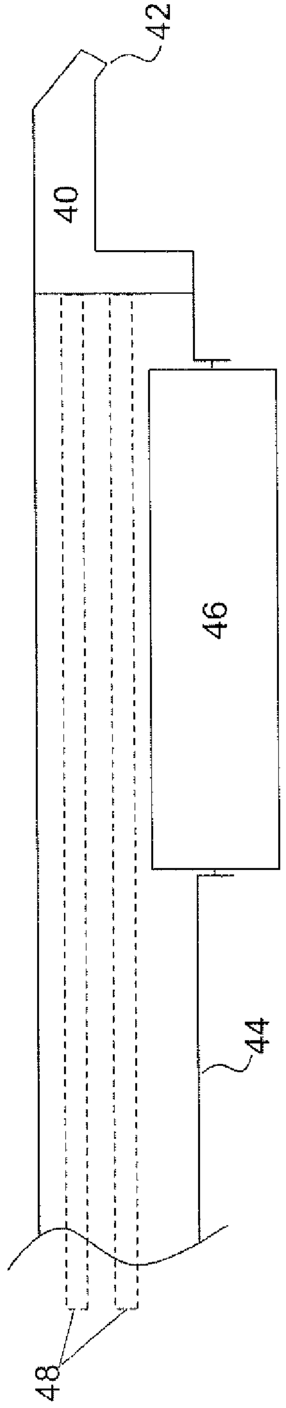
FIG. 4 is a schematic diagram of a spray assembly for uniformly spray coating an interior surface of a stator tube according to embodiments disclosed herein.

To provide a consistent bond strength between the housing and the elastomeric lining along the length of the stator, the interior surface of the stator housing may be spray coated with an adhesive using the spray assembly as illustrated in FIG. 4. Spray assemblies according to embodiments disclosed herein may include a spray head 40, which includes a nozzle 42 for spraying a coating material on an internal surface of a stator tube (not shown). The spray head 40 may be coupled to a support wand 44. The support wand 44 may provide physical support to the spray head 40, maintaining the spray head 40 in place, and may be coupled by various means, including screws, bolts, and the like.

Support wand 44 may be any shape in cross-section, and in some embodiments may be tubular. The interior portion of support wand 44 may be hollow, such as when support wand 44 is tubular, providing a housing for one or more flow conduits 48 fluidly connected to the spray head 40 for delivering a coating material, a component of a coating material, or an atomizing agent to the nozzle 42, which may be provided by one or more supply tanks or other sources (not shown) fluidly connected to the flow conduits 48.

The supply or storage tanks may include pumps, control valves, or other devices for delivering and regulating flow through flow conduits 48 to spray head 40 and nozzle 42. In some embodiments, the supply tanks may include a pressure control device to maintain a pressure in the storage tanks and a delivery pressure of the coating material or the component of the coating material to the nozzle.

Spray head 40 may additionally include one or more mixing chambers (not shown) to mix two or more components of a coating material. Alternatively or additionally, one or more mixing chambers (not shown) may be provided within support wand 44.

Figure 5:
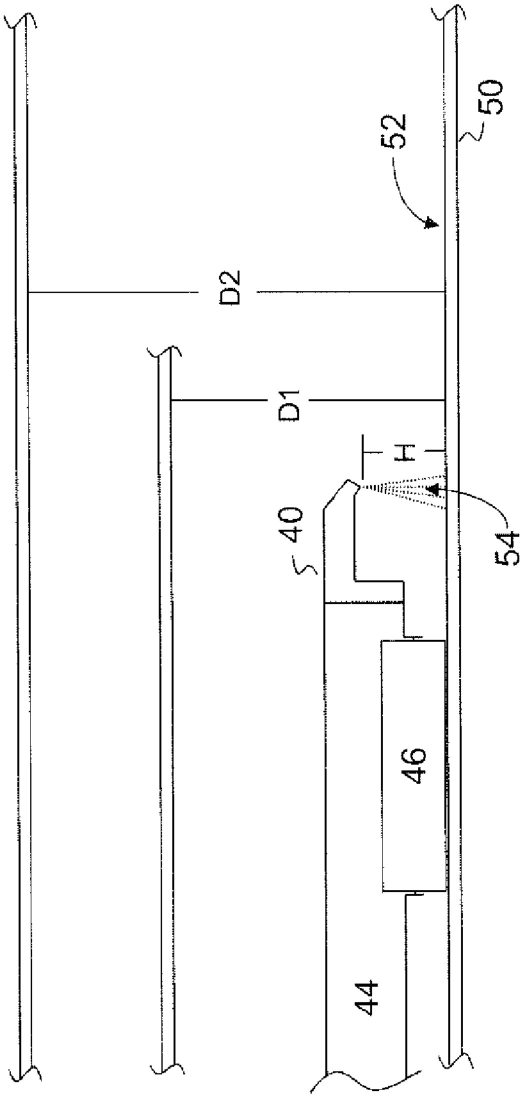
FIG. 5 is a schematic diagram of a spray assembly for uniformly spray coating an interior surface of a stator tube according to embodiments disclosed herein.

Referring now to FIGS. 4 and 5, the spray assembly also includes a roller sleeve 46 rotatably connected to support wand 44. Roller sleeve 46 is configured to contact the internal surface 52 of a cylinder 50 (e.g., stator tube 50) being coated, and to rotate radially as the cylinder 50 is rotated. In this manner, nozzle 42 is located a height H from the internal surface 52 of cylinder 50, and maintains height H throughout the coating process, regardless of the diameter of cylinder 50. As illustrated, abutment of roller sleeve 46 against internal surface 52 results in nozzle 42 being a height H, even for operation with a first cylinder 50 having a diameter D1 and a second cylinder 50 having a diameter D2.

In operation, the spray assembly is inserted into cylinder 50 and positioned such that roller sleeve 46 abuts internal surface 52. While supplying coating material to spray head 40/nozzle 42, cylinder 50 is rotated and the spray assembly is withdrawn from cylinder 50. In this manner, the coating material is supplied to internal surface 52 in a helical pattern.

As used herein, the terms "insert," "inserted," "inserting", "withdraw," "withdrawn," and "withdrawing" are used with respect to the relative positions of the cylinder and the spray assembly, and are not limiting with respect to the action-device combination specified. As may be appreciated by one skilled in the art, a cylinder 50 may be placed around the spray assembly and positioned such that the roller sleeve abuts internal surface 52, and the cylinder 50 may be rotated and drawn away from the spray assembly. Such a process is encompassed by "inserting" and "withdrawing" as used herein.

Figure 6:
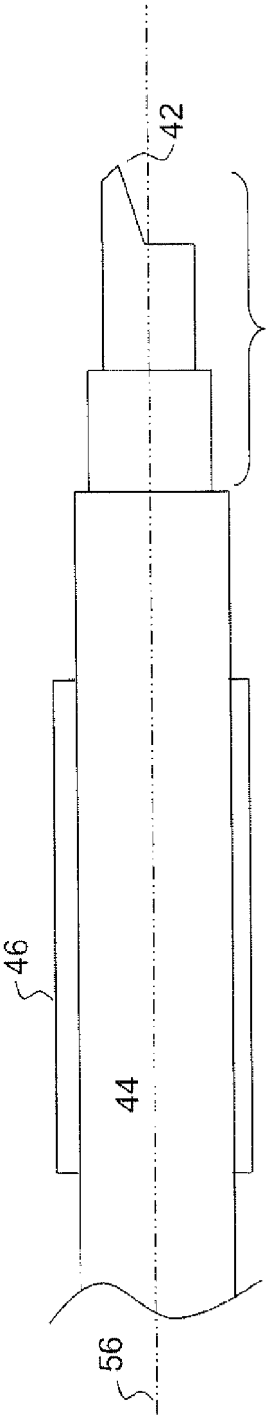
FIG. 6 is a schematic diagram of a spray assembly for uniformly spray coating an interior surface of a stator tube according to embodiments disclosed herein.

Referring now to FIG. 6, a spray assembly according to other embodiments disclosed herein is illustrated, where like numerals represent like parts. In this embodiment, roller sleeve 46 is disposed circumferentially around at least a portion of support wand 44. Use of a circumferential roller sleeve 46 may simplify construction of the spray assembly. Additionally, a circumferential roller sleeve 46 may allow for each of support wand 44, roller sleeve 46, and spray head 40 to be aligned on the same centerline 56, which may advantageously help control the center of gravity for the spray assembly (i.e., no weight distribution disadvantage), providing improved contact between roller sleeve 46 and internal surface 52, even where internal surface 52 is irregular.

Regarding irregular internal surfaces, stator tubes and other cylinders that may be coated according to embodiments disclosed herein may have rough internal surfaces, threaded internal surfaces, or patterned internal surfaces. For example, stator tubes may have an internal surface that includes a helical bore, matching the helical shape and lobes of an elastomeric lining inserted or molded within the stator tube.

Figure 7:
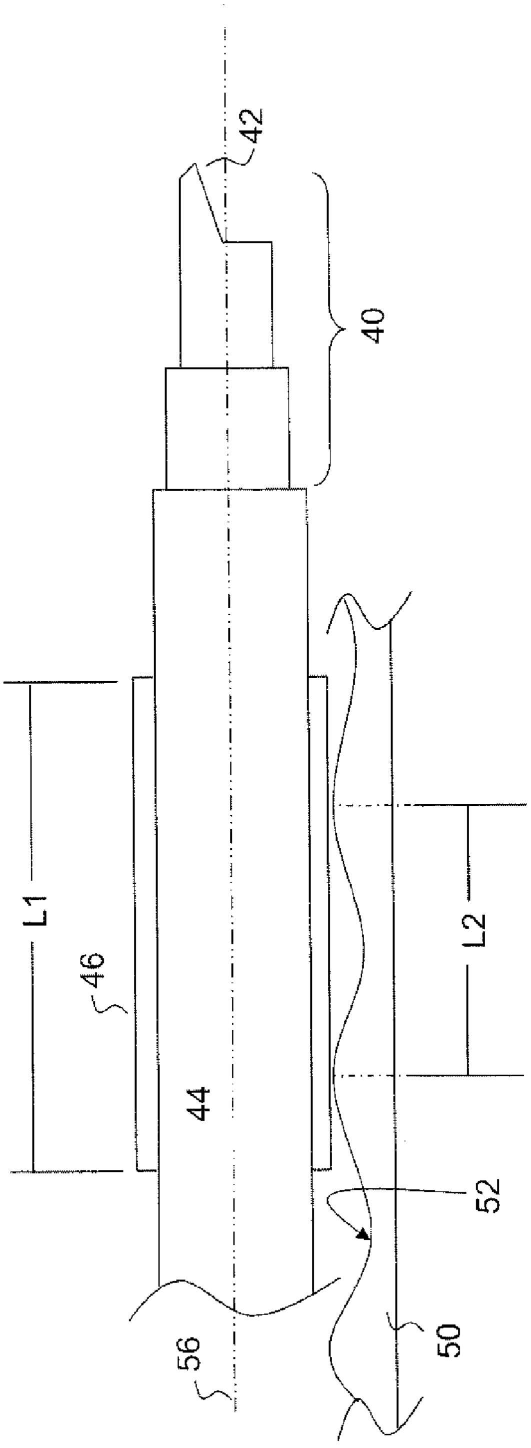
FIG. 7 is a schematic diagram of a spray assembly for uniformly spray coating an interior surface of a stator tube according to embodiments disclosed herein.

Referring now to FIG. 7, a spray assembly according to embodiments disclosed herein may include a roller sleeve that has a length L1 that is greater than a pitch L2 of a helical bore or other patterned internal surface 52. In this manner, the withdrawal of the spray assembly from cylinder 50 may result in a smooth and continuous draw, unaffected by contour changes of internal surface 52. Having a properly sized registration surface (roller sleeve length) may thus result in little or no bounce (swings in the position of the nozzle).

As noted above, spray assemblies may maintain a height H throughout the coating process, regardless of the diameter of cylinder. For embodiments where the internal surface of the cylinder is patterned, such as including a helical bore as illustrated in FIG. 7, spray assemblies disclosed herein may also maintain a constant height H relative to the apex of the reference surface (e.g., the apex of the lobes of the helical bore).

When the roller sleeve has a length greater than the pitch of the internal surface of the stator tube, it may also be desirable to taper one or both ends of the roller sleeve. As one skilled in the art could appreciate, when withdrawing the spray assembly, a sharp corner on the back end of roller sleeve 46 may cause the spray assembly to undesirably catch a groove in the internal surface 52, affecting the spray pattern or scraping a lower coating layer of a multi-pass coating process (such as including a primer or a top coat for example). Similarly, a tapered front end may be advantageous when inserting the spray assembly into a stator tube.

Figure 8:
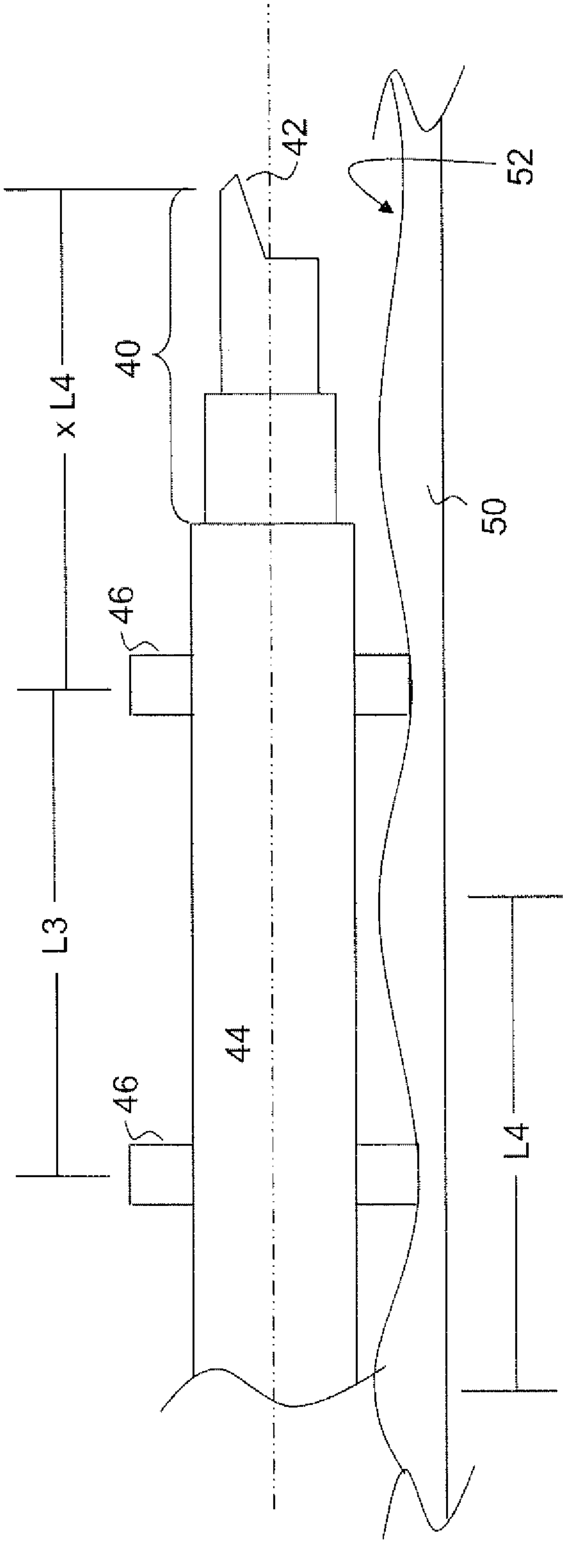
FIG. 8 is a schematic diagram of a spray assembly for uniformly spray coating an interior surface of a stator tube according to embodiments disclosed herein.

Referring now to FIG. 8, a spray assembly according to embodiments disclosed herein may include two or more roller sleeves 46 spaced apart a distance L3 equivalent to pitch L4. Additionally, nozzle 42 may be located from the closest roller sleeve 46 a distance equivalent to pitch L4 or a multiple of pitch L4 (i.e., 1×, 2×, 3×, etc.). In this manner, the spray nozzle 42 may maintain a height from internal surface 52, including the peaks and valleys; when the roller sleeves are atop apexes of the surface, the nozzle is also above an apex, and when the roller sleeves are in a valley, the nozzle is also above a valley. Naturally, in such an embodiment, the height of the roller sleeves must be greater than a height of the apexes to avoid dragging of the support wand 44.

As noted above, the rotation and draw of the cylinder with respect to the spray assembly results in application of the coating material in a helical pattern. The resulting coating thickness may thus depend upon the delivery rate of the coating material, as well as the degree of overlap in spray pattern 54. At a minimum, each rotation of cylinder 50 should result in adjacent coating passes, thus providing coating material to a continuous length of cylinder 50, which may be less than the entire length of cylinder 50.

In other embodiments, it may be desirable to have some degree of overlap, such as 25%, 33%, 50%, 66%, 75%, or other values in the range from about 1% to about 99%. An overlap of 25% may result in approximately 50% of the coating having one thickness and 50% of the coating having another thickness (the middle 50% effectively being coated with only a single pass. An overlap of 50% would provide a consistent coating thickness, resulting in two passes over each portion of the cylinder.

Spray assemblies according to embodiments disclosed herein may result in a coating layer that is repeatable, pass to pass and cylinder diameter to cylinder diameter. For example, when coating a cylinder having a diameter D1, the cylinder may be rotated at a desired angular velocity w and drawn at a desired draw rate. As used herein, "draw rate" is defined as the relative distance the nozzle moves along the axis of the cylinder per complete revolution of the cylinder. When coating a second cylinder having a diameter D2 with a similar coating composition, rotating the cylinder at the same angular velocity and drawing the cylinder at the same draw rate will result in the substantially the same coating thickness.

The coating thickness is repeatable regardless of cylinder diameter because the height of the nozzle is maintained when coating both cylinders. In contrast, a spray nozzle centered in the cylinders will have a different height between the nozzle and the internal surface of the cylinder, introducing changes in spray (fan) width and turbulence, among other factors. By keeping the height of the nozzle constant, spray nozzles according to embodiments disclosed herein negate various effects such as turbulence and fan width.

The negation of variables such as turbulence may also provide for easy transitions between cylinder diameters. When using a spray nozzle centered in the cylinders, when changing cylinder diameters, it may be necessary to adjust numerous control variables, such as draw rate, rotation speed, coating composition delivery rates, and atomization gas (such as air) delivery rates, if any, to achieve a consistent coating thickness. In contrast, for a given coating composition, spray assemblies according to embodiments disclosed herein may not require a change in any control variable when changing cylinder diameters to arrive at a similar coating thickness. One set of control settings may thus be applied for all cylinder diameters for a given coating composition, providing for significantly less variability in product quality, even over multiple diameters.

The above-described benefits, including consistent, repeatable coating thickness apply to both tubes having a regular internal surface or an irregular internal surface. For tubes having an irregular surface, the constant distance relative to the apexes similarly provides consistency and repeatability, even over tubes having different diameters.

To form stators useful in mud motors, as described above, following spray coating of the internal surface of the stator tube, the spray coating may be allowed to dry (i.e., solvent removal), if necessary. Subsequently, an elastomeric stator lining may be inserted or molded into the coated stator tubes. If necessary, heat and/or pressure may then be applied to activate the adhesive coating, bonding with or reacting with the stator lining and/or the internal surface of the stator tube. Due to the consistent spray coating thickness provided by embodiments of the spray assemblies disclosed herein, a consistent adhesive strength along the length of the tube may result.

While described above with respect to spray coating the interior surface of stator tubes, spray assemblies disclosed herein may be useful for spray coating the internal surface of other tubular or cylindrical bodies with adhesives or other coating materials, such as corrosion inhibitors, lubricating compounds, anti-galling compounds, and paints, among others.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed:

1. A spray assembly for use in coating a regular or irregular internal surface of a cylinder, the assembly comprising:

- a spray head comprising a nozzle for spraying a coating material on an internal surface of a cylinder;
- a support wand coupled to the spray head and maintaining the spray head in place; and
- a roller sleeve rotatably connected to the support wand and configured to contact the internal surface of the cylinder and to rotate as the cylinder is rotated.

2. The spray assembly of claim 1, wherein the support wand is tubular, the assembly further comprising one or more flow conduits disposed in the support wand and fluidly connected to the spray head for delivering the coating material, a component of the coating material, or an atomizing agent to the nozzle.

3. The spray assembly of claim 2, further comprising one or more storage tanks fluidly connected to the one or more flow conduits for supplying at least one of the coating material, the component of the coating material, and the atomizing agent.

4. The spray assembly of claim 3, wherein the one or more storage tanks have a pressure control device to maintain a pressure therein and a delivery pressure of the coating material or the component of the coating material to the nozzle.

5. The spray assembly of claim 1, wherein the spray head further comprises a mixing chamber for mixing two or more components of the coating material.

6. The spray assembly of claim 1, wherein at least one end portion of the roller sleeve is tapered.

7. The spray assembly of claim 6, wherein both end portions of the roller sleeve are tapered.

8. The spray assembly of claim 1, wherein the roller sleeve has a length greater than a pitch of the internal surface of the cylinder.

9. The spray assembly of claim 1, wherein the roller sleeve is disposed circumferentially around at least a portion of the support wand.

10. The spray assembly of claim 9, wherein a centerline for each of the wand, the roller sleeve, and the spray head is identical.

11. A method for spray coating an internal surface of a cylinder, the method comprising:

- inserting a spray assembly into a cylinder, the spray assembly comprising:
  - a spray head comprising a nozzle for spraying a coating material on an internal surface of the cylinder;
  - a support wand coupled to the spray head and maintaining the spray head in place; and
  - a roller sleeve rotatably connected to the support wand and configured to contact the internal surface of the cylinder and to rotate as the cylinder is rotated;
- withdrawing the spray assembly from the cylinder while rotating the cylinder;
- supplying the coating material to the spray head to coat the internal surface of the cylinder with the coating material.

12. The method of claim 11, wherein the support wand is tubular, the assembly further comprising one or more flow conduits disposed in the support wand and fluidly connected to the spray head for delivering the coating material, a component of the coating material, or an atomizing agent to the nozzle.

13. The method of claim 12, further comprising one or more storage tanks fluidly connected to the one or more flow conduits for supplying at least one of the coating material, the component of the coating material, and the atomizing agent.

14. The method of claim 13, wherein the one or more storage tanks have a pressure control device to maintain a pressure therein and a delivery pressure of the coating material or the component of the coating material to the nozzle.

15. The method of claim 11, wherein the spray head further comprises a mixing chamber for mixing two or more components of the coating material.

16. The method of claim 11, wherein at least one end portion of the roller sleeve is tapered.

17. The method of claim 16, wherein both end portions of the roller sleeve are tapered.

18. The method of claim 11, wherein the internal surface of the cylinder comprises a helical bore.

19. The method of claim 18, wherein the roller sleeve has a length greater than a pitch of the helical bore.

20. The method of claim 11, wherein the roller sleeve is disposed circumferentially around at least a portion of the support wand.

21. The method of claim 20, wherein a centerline for each of the wand, the roller sleeve, and the spray head is identical.

22. The method of claim 11, wherein the cylinder comprises a stator tube.

23. A method of manufacturing a stator, comprising:

- inserting a spray assembly into a stator tube, the spray assembly comprising:
  - a spray head comprising a nozzle for spraying a coating material on an internal surface of the stator tube;
  - a support wand coupled to the spray head and maintaining the spray head in place; and
  - a roller sleeve rotatably connected to the support wand and configured to contact the internal surface of the stator tube and to rotate as the stator tube is rotated;

supplying the coating material to the spray head to coat the internal surface of the stator tube with the coating material;

withdrawing the spray assembly from the stator tube while rotating the stator tube; and subsequently inserting or molding an elastomeric stator lining into the stator tube.

24. The method of claim 23, wherein the support wand is tubular, the assembly further comprising one or more flow conduits disposed in the support wand and fluidly connected to the spray head for delivering the coating material, a component of the coating material, or an atomizing agent to the nozzle.

25. The method of claim 24, further comprising one or more storage tanks fluidly connected to the one or more flow conduits for supplying at least one of the coating material, the component of the coating material, and the atomizing agent.

26. The method of claim 25, wherein the one or more storage tanks have a pressure control device to maintain a pressure therein and a delivery pressure of the coating material or the component of the coating material to the nozzle.

27. The method of claim 23, wherein the spray head further comprises a mixing chamber for mixing two or more components of the coating material.

28. The method of claim 23, wherein at least one end portion of the roller sleeve is tapered.

29. The method of claim 28, wherein both end portions of the roller sleeve are tapered.

30. The method of claim 23, wherein the internal surface of the stator tube comprises a helical bore.

31. The method of claim 30, wherein the roller sleeve has a length greater than a pitch of the helical bore.

32. The method of claim 23, wherein the roller sleeve is disposed circumferentially around at least a portion of the support wand.

33. The method of claim 32, wherein a centerline for each of the wand, the roller sleeve, and the spray head is identical.

34. A method for uniformly spray coating an internal surface of cylinders having different internal diameters, the method comprising:

inserting a spray assembly into a first cylinder, the spray assembly comprising:

a spray head comprising a nozzle for spraying a coating material on an internal surface of the first cylinder;

a support wand coupled to the spray head; and a roller sleeve rotatably connected to the support wand and configured to contact the internal surface of the first cylinder and to rotate as the first cylinder is rotated;

supplying the coating material to the spray head to coat the internal surface of the first cylinder with the coating material;

withdrawing the spray assembly from the first cylinder while rotating the first cylinder;

inserting the spray assembly into a second cylinder having a different internal diameter than the first cylinder;

supplying the coating material to the spray head to coat the internal surface of the second cylinder with the coating material;

withdrawing the spray assembly from the second cylinder while rotating the second cylinder.

35. The method of claim 34, wherein the support wand is tubular, the assembly further comprising one or more flow conduits disposed in the support wand and fluidly connected to the spray head for delivering the coating material, a component of the coating material, or an atomizing agent to the nozzle.

36. The method of claim 35, further comprising one or more storage tanks fluidly connected to the one or more flow conduits for supplying at least one of the coating material, the component of the coating material, and the atomizing agent.

37. The method of claim 36, wherein the one or more storage tanks have a pressure control device to maintain a pressure therein and a delivery pressure of the coating material or the component of the coating material to the nozzle.

38. The method of claim 34, wherein the spray head further comprises a mixing chamber for mixing two or more components of the coating material.

39. The method of claim 34, wherein at least one end portion of the roller sleeve is tapered.

40. The method of claim 39, wherein both end portions of the roller sleeve are tapered.

41. The method of claim 34, wherein the internal surface of at least one of the first cylinder and the second cylinder comprises a helical bore.

42. The method of claim 41, wherein the roller sleeve has a length greater than a pitch of the helical bore.

43. The method of claim 34, wherein the roller sleeve is disposed circumferentially around at least a portion of the support wand.

44. The method of claim 43, wherein a centerline for each of the wand, the roller sleeve, and the spray head is identical.

45. The method of claim 34, wherein at least one of the first cylinder and the second cylinder comprises a stator tube.

46. The method of claim 34 wherein the withdrawing the spray assembly from the first cylinder while rotating the first cylinder is performed at a first draw rate and a first angular velocity; and wherein the withdrawing the spray assembly from the second cylinder while rotating the second cylinder is performed at a second draw rate and a second angular velocity.

47. The method of claim 46, wherein, for a similar coating composition, coatings of substantially the same thickness are achieved on the interior surface of the first cylinder and the second cylinder when the first angular velocity is equivalent to the second angular velocity and when the first draw rate is equivalent to the second draw rate.

* * * * *